US005653116A

United States Patent [19]
Erickson et al.

[11] Patent Number: 5,653,116
[45] Date of Patent: Aug. 5, 1997

[54] TRIPLE-EFFECT ABSORPTION CYCLE WITH CONDENSATE-TO-SOLUTION SENSIBLE HEAT EXCHANGER

[76] Inventors: Donald C. Erickson, 1704 S. Harbor La.; Shailesh V. Potnis, 1008 Primrose Rd. #301, both of Annapolis, Md. 21401

[21] Appl. No.: 583,784

[22] Filed: Jan. 11, 1996

[51] Int. Cl.$^6$ ............................................. F25B 15/00
[52] U.S. Cl. ........................... 62/101; 63/476; 63/486
[58] Field of Search ............................ 62/101, 476, 485, 62/486, 489

[56] References Cited

U.S. PATENT DOCUMENTS

| | | | |
|---|---|---|---|
| 3,299,667 | 1/1967 | Aronson et al. | 62/485 |
| 3,550,394 | 12/1970 | Peckham | 62/485 |
| 4,542,628 | 9/1985 | Sarkisian et al. | 62/335 |
| 4,702,085 | 10/1987 | Gockel et al. | 62/101 |
| 4,827,728 | 5/1989 | DeVault et al. | 62/79 |
| 5,467,614 | 11/1995 | DeVault | 62/476 |

*Primary Examiner*—William Doerrler

[57] ABSTRACT

A triple-effect cycle is disclosed which avoids the two primary limitations of currently known triple-effect cycles: super-atmospheric pressures and/or low pressure absorbers that operate without mass transfer enhancers. The cycle is comprised of two hermetic loops—one a conventional LiBr double-effect loop, and the other a single-effect loop which overlaps the high pressure portion of the double-effect loop, and exchanges heat with it at three locations. Referring to FIG. 3, the latent heat exchanges are with absorber 302, condenser 304, and evaporator 305 of the single-effect loop. Sensible heat losses are reduced by incorporating inter-loop condensate-to-solution sensible heat exchanger 314. The inter-loop CSSHX also applies to other triple-effect cycles.

19 Claims, 3 Drawing Sheets

TRIPLE-EFFECT ABSORPTION CYCLE WITH CONDENSATE-TO-SOLUTION SENSIBLE HEAT EXCHANGER

In the search for more fuel efficient gas-fired chillers, substantial effort has been devoted recently to triple-effect cycles. However numerous difficulties have been encountered. In all cases the new high temperature generator must be at substantially higher temperatures than normal practice-well in excess of 200° C. The conventional LiBr absorbent becomes highly corrosive at those temperatures, even with conventional corrosion inhibitors. also the conventional mass transfer additives such as octyl alcohol are not thermally stable at that temperature.

One approach to achieving triple-effect is to add a third pressure stage, but that increases the maximum pressure to well above atmospheric, involving code restrictions associated with pressure vessels. The other approach is to add a concentration stage. However this requires a much wider solubility field than is possible with conventional LiBr. Accordingly various solubility extenders are added which further exacerbate the corrosion and mass transfer difficulties One disclosure which partially alleviates the above problem is the "dual loop" cycle (U.S. Pat. No. 4,732,008). Two hermetically separate single-effect loops are provided, with latent heat exchange from the absorber and condenser of the higher temperature loop to the generator of the lower temperature loop. This approach avoids super-atmospheric pressures, and also permits use of conventional corrosion inhibitors and mass transfer additives in the lower temperature loop. However the higher temperature loop requires the absorber to be at deep vacuum on the order of 1 kPa. An exceptionally wide solubility field is required, necessitating more solubility enhancing additives. Those additives, the low pressure, and the absence of Marangoni effect surfactants all conspire to make the low pressure high temperature absorption step extremely difficult. Furthermore the large temperature difference between high temperature generator and high temperature absorber increases the sensible heat losses, limiting the efficiency gains and achievable COP.

It would be desirable, and included among the objectives of this invention, to provide a triple-effect cycle with reduced sensible heat losses. Further advantageous objectives are to avoid the requirement for a very low pressure absorber without mass transfer additives; the requirement for large amounts of solubility extenders which degrade solution viscosity; the requirement for super-atmospheric pressures; and the requirement to operate in close proximity to crystallization conditions. It would further be desirable to make maximum use of proven LiBr double-effect cycle technology, and to use less corrosive absorbent solution in the high temperature generator.

DISCLOSURE OF INVENTION

The above and other useful objectives are achieved via providing a triple-effect cycle which incorporates two hermetically separate loops or cycles—each comprised of generator, absorber, condenser, evaporator, plus absorbent solution—and which has an exchange of sensible heat from the condensate of one loop to the absorbent solution of the other. The condensate will typically be cooled by at least about 35° C. thereby. The sensible heat may advantageously be supplied to the absorbent solution en route to the latent heat exchanger (steam heated generator) from which the condensate was withdrawn. Thus the condensate sensible heat effectively adds to the duty of that latent heat exchanger, even though most of the sensible heat transferred is at lower temperature than that heat exchanger.

The pressure and solubility field objectives are further obtained by combining a LiBr double-effect cycle with a hermetically separate single-effect loop (or cycle) which overlaps or envelopes the higher pressure portion of the LiBr double-effect cycle, and exchanges latent heat with it at three locations. Adding the condensate to solution sensible heat exchanger (CSSHX) to this triple-effect cycle yields the most advantageous overall result—a cycle COP exceeding 1.8 achieved with relatively less heat transfer surface and relatively more benign overall conditions.

BEST MODE FOR CARRYING OUT THE INVENTION

Figure 1:
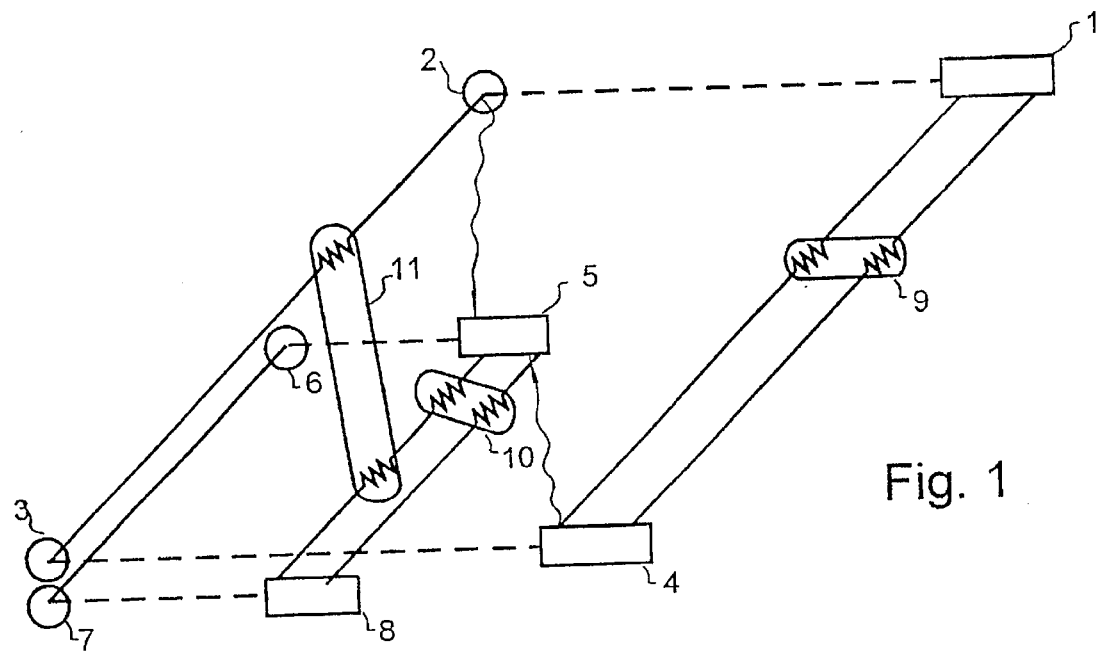
FIG. 1 illustrates the thermodynamic statepoints (P-T-X, or pressure temperature concentration) of the prior art dual loop cycle but enhanced with the CSSHX.

Referring to FIG. 1, the prior art dual loop cycle is comprised of two hermetic loops—the higher pressure and temperature loop comprised of high temperature generator 1, high temperature condenser 2, high temperature evaporator 3, and high temperature absorber 4; and the lower pressure, lower temperature loop comprised of lower temperature generator 5, lower temperature condenser 6, lower temperature evaporator 7, and lower temperature absorber 8. High temperature condenser 2 and high temperature absorber 4 supply latent heat to lower temperature generator 5. Evaporators 3 and 7 extract heat from the chill water circuit. Condenser 6 and absorber 8 reject heat to cooling water. Prime heat is supplied at generator 1. Solution heat exchanger 9 reduces the sensible heat loss associated with circulating the high temperature absorbent through the large temperature difference between generator 1 and absorber 4. Similarly solution heat exchanger 10 reduces the sensible heat losses associated with circulating the low temperature absorbent. However thermodynamically the weak solution, having more water content requires more sensible heating than the strong solution is able to provide, presenting what has heretofore been an unavoidable sensible heat loss. However it is now disclosed that that loss can be reduced or eliminated, and overall cycle COP is increased by 5% or more, by providing loop-to-loop sensible heat transfer, according to CSSHX 11.

Figure 2:
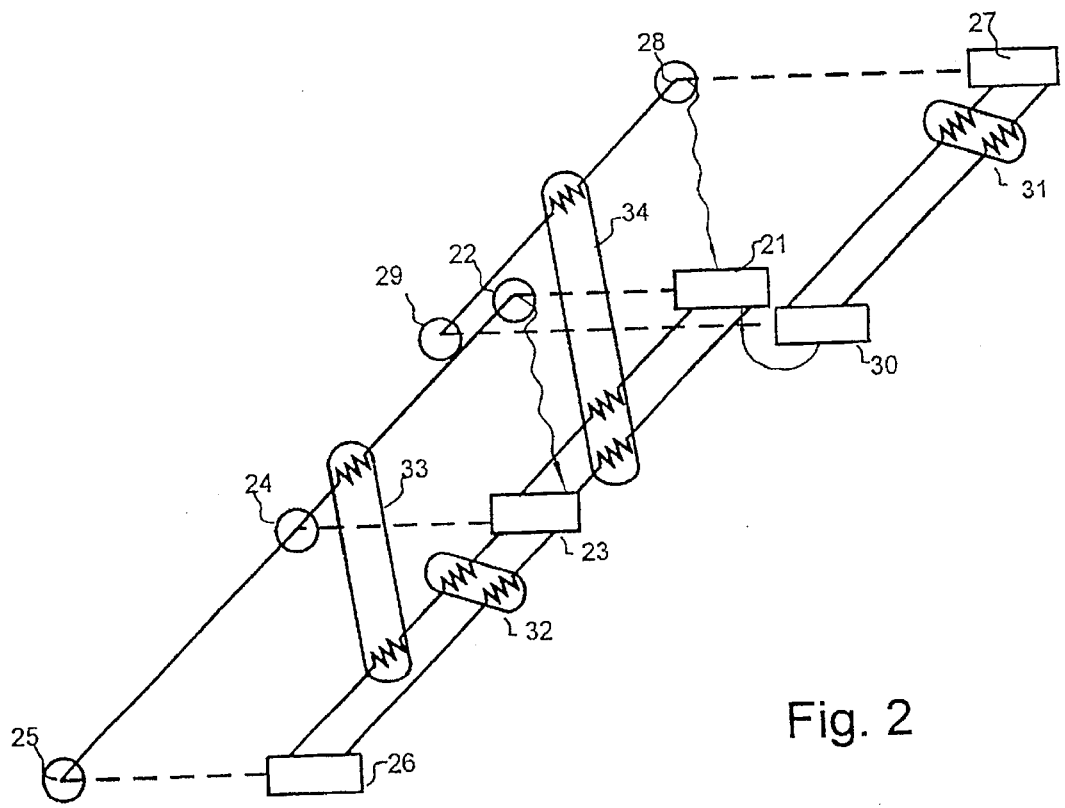
FIG. 2 illustrates the P-T-X of a pressure staged triple-effect cycle comprised of conventional LiBr double-effect cycle plus topping cycle, and with appropriately placed CSSHX.

Referring to FIG. 2, the P-T-X of a pressure staged topping cycle variant of the two loop triple-effect cycle is depicted. One of the loops is a conventional LiBr double-effect cycle, comprised of high pressure generator 21, high pressure condenser 22, low pressure generator 23, low pressure condenser 24, evaporator 25, and absorber 26. The topping cycle is comprised of high temperature generator 27, high temperature condenser 28, high temperature evaporator 29, and high temperature absorber 30. Condenser 28 and absorber 30 supply latent heat to generator 21. Condenser 22 supplies latent heat both to evaporator 29 and to generator 23. Absorbent solution heat exchangers 31 and 32 reduce sensible heat losses in respectively the high temperature loop and the double-effect loop. Condensate to solution sensible heat exchanger (CSSHX) 33 further reduces the sensible heat loss by recouping the sensible heat of the condensate of the double-effect loop into the absorbent of the double-effect loop. CSSHX 34 further reduces sensible heat losses with an inter-loop transfer of sensible heat, i.e., from the condensate of the high temperature loop to the absorbent solution of the double-effect loop.

Whereas both the FIG. 1 and FIG. 2 triple-effect cycles enjoy improved efficiency relative to current practice owing to the inclusion of CSSHX, each retains certain disadvantages. A primary advantage of the FIG. 2 cycle is that is can use the non-corrosive absorbent Alkitrate in the high temperature loop. However its disadvantage is that it requires super-atmospheric pressures in that loop. The FIG. 1 flowsheet has the disadvantages of a high temperature low pressure absorber. Conventional low pressure absorption cooled by cooling water is difficult, even with enhancers. To conduct the absorption without enhancers, at high temperature, in the presence of solubility additives (most of which increase viscosity), and with heat transfer to a generator, is an extremely difficult and costly proposition.

Figure 3:
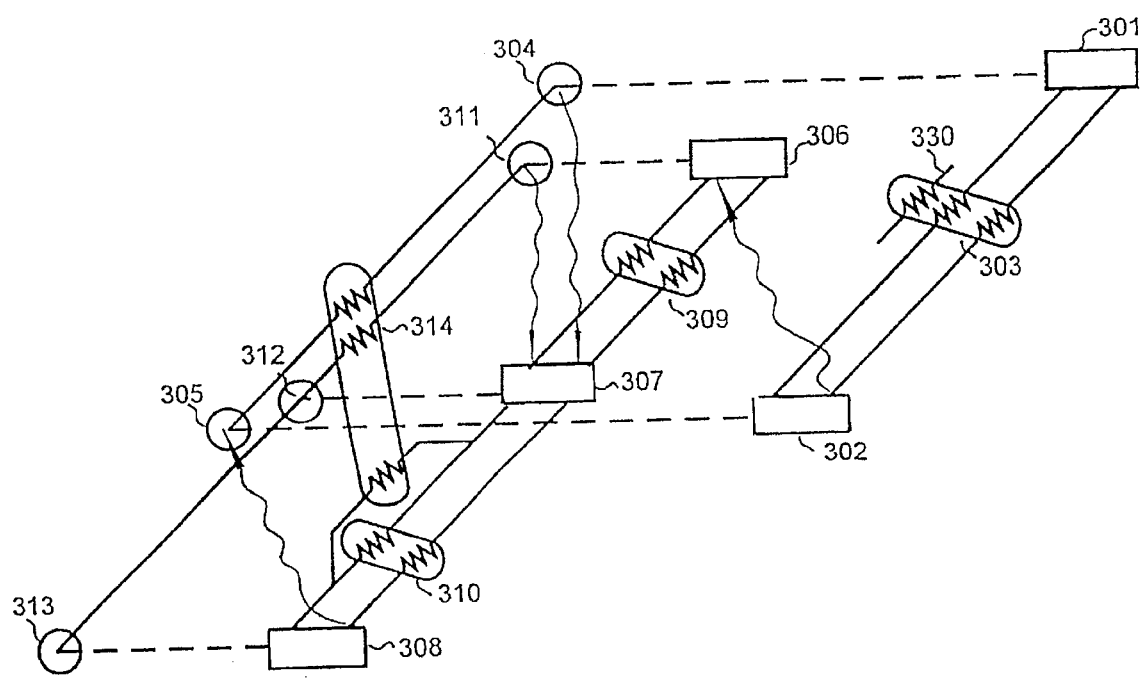
FIG. 3 illustrates the P-T-X of the disclosed High Pressure Overlap triple-effect cycle, comprised of a LiBr double-effect cycle plus a hermetically separate single-effect cycle which overlaps the high pressure portion of the double-effect cycle, and with appropriately placed CSSHX.

The above disadvantages (super-atmospheric pressure generation and very low pressure absorption) are avoided by the triple-effect cycle with P-T-X as depicted in FIG. 3. The lower temperature loop is once again a conventional double-effect cycle, but the higher temperature loop overlaps the high pressure portion of the double-effect cycle, and extends out to higher concentrations (as opposed to higher pressures as in FIG. 2). The high temperature absorbent circulates between high temperature generator 301 and absorber 302, with sensible heat recuperated at solution heat exchanger 303. Steam from generator 301 is condensed at high temperature condenser 304, and the condensate is let down in pressure and then evaporated at medium pressure evaporator 305, which supplies steam to medium absorber 302.

In the double-effect loop, absorbent (e.g. LiBr with conventional corrosion inhibitors and mass transfer enhancer) is circulated between high pressure generator 306, low temperature generator 307, and low pressure absorber 308. Sensible heat is recuperated at solution heat exchangers 309 and 310. Steam from high pressure generator 306 is condensed at high pressure condenser 311, which supplies latent heat to low temperature generator 307. Steam from low temperature generator 307 is condensed at low temperature condenser 312, which gives up part of its heat to cooling water. Condensate from condensers 311 and 312 is let down to the pressure of low pressure evaporator 313, which extracts heat from circulating chill water. The (very) low pressure steam from evaporator 313 is absorbed in low pressure absorber 308.

The two loops exchange latent heat at three locations: from absorber 302 to generator 306; from condenser 304 to generator 307; and from either absorber 308 or condenser 312 to evaporator 305. CSSHX 314 recuperates the condensate sensible heat from both loops to the absorbent solution of the double-effect loop. Note that evaporator 305 only requires about half the heating duty available from either condenser 312 or from absorber 308. Thus whichever is used to heat evaporator 305, it must also include conventional cooling via cooling water. Thermodynamically it is somewhat preferable to supply evaporator 305 heat from the warmest end of absorber 308, as a higher evaporator pressure results. However the difficulties of low pressure absorption enable choice of condenser 312 as heat source to be simpler to realize in hardware.

Figure 4:
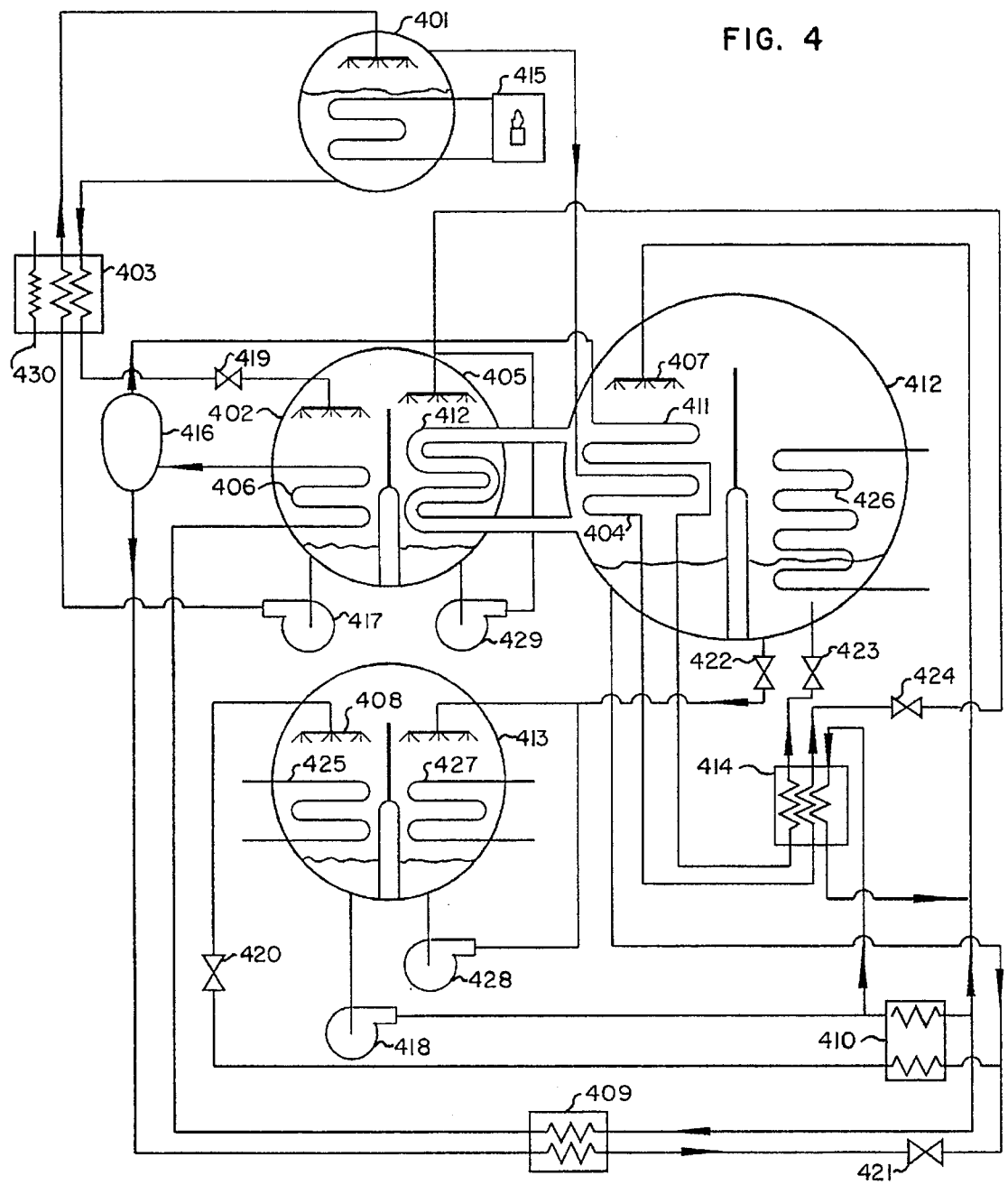
FIG. 4 illustrates a schematic flowsheet representation of the FIG. 3 cycle.

FIG. 4 is a schematic flowsheet of the cycle depicted in FIG. 3 wherein the components with 400 series numbers of FIG. 4 correspond to the like-numbered 300 series components of FIG. 3. Additional features depicted in FIG. 4 include means for prime heat input 415; steam separator 416; high temperature absorbent circulating pump 417; double-effect loop absorbent circulating pump 418; high temperature absorbent letdown valve 419; double-effect loop absorbent letdown valves 420 and 421; condensate letdown valves 422, 423, and 424; cooling water heat exchangers 427; and optional condensate recirc pumps 428 and 429. Note that the steam evaporated from low temperature generator 407 is condensed in two different locations—partly by cooling water 426, and partly by medium pressure evaporator 405 and that both condensations taken together comprised condenser 412.

Medium pressure absorber 302/402 operates at much less stringent solubility conditions than LP absorber 4 of FIG. 1. Accordingly more choices are available for absorbent solution in that loop, having more favorable transport and corrosion properties. For an LiBr based mixture, substantially less solubility additive is required. Other candidate absorbents include: a mixture of NaOH and KOH (U.S. Pat. No. 4,614,605); a mixture of thiocyanates (U.S. Pat. No. 4,801,393); or a mixture of alkali nitrates including $CsNO_3$ and/or $RbNO_3$.

The novel CSSHX, which improves the performance of all the above triple-effect cycles, can similarly be applied to any other triple-effect cycle with comparable benefit. Since both the condensate and the strong absorbent are transferring sensible heat to the weak absorbents, there are several possible heat exchanger configurations to accomplish this. FIGS. 1, 2, and 3 illustrate the three most advantageous ways this can be done. It will be recognized that any of these realizations can be applied to any triple-effect cycle, not constrained by the particular combinations illustrated here.

Other means for further reduction of sensible heat loss may also be present. For example, the hot exhaust gas remaining after supplying heat to generator 301 may be further cooled by sensibly heating the weak solution, e.g. at heating passage 330.

In general, there is a temperature difference of at least about 50° C. between each effect of a triple-effect cycle. The condensate should be cooled at least about 80% of that difference (e.g. by 40° C.) while the weak absorbent should be sensibly heated by at least about 60% of that difference (e.g. by 30° C.). The LMTD of the sensible (liquid-to-liquid) heat exchanger should be no more than about 30% of that difference (e.g. 15° C.).

PRIOR ART DISCLOSURES

Prior art disclosures have also been directed at the objective of reducing triple-effect cycle sensible heat losses by recuperating the sensible heat of condensate. Examples appear in U.S. Pat. Nos. 4,551,991; 5,205,136; and 5,467,614. In each instance however the condensate sensible heat is degraded by allowing the condensate to flash to a lower pressure, and then the steam produced thereby transfers latent heat to boiling absorbent solution. The net result is that the recuperated heat ends up in a lower temperature generator compared to the present disclosure, and hence the recuperated heat only yields about half as much cycle efficiency improvement. Furthermore, the prior art approach entails a latent-to-latent heat exchange at low pressure, which is more difficult and costly to accomplish than the herein disclosed liquid-to-liquid heat exchange.

We claim:

1. A triple-effect absorption cycle cooling apparatus comprised of:
   a) a double-effect loop comprised of a medium temperature high pressure generator plus associated medium temperature high pressure condenser; and a low temperature generator plus associated low temperature condenser; and a low pressure evaporator plus associated low pressure absorber;
   b) a hermetically separate loop comprised of high temperature generator and associated high temperature condenser; plus a medium pressure evaporator plus associated medium pressure absorber; and
   c) means for exchanges of latent heat:
      i) from high temperature condenser to low temperature generator;
      ii) from medium temperature high pressure condenser to low temperature generator;
      iii) from medium pressure absorber to medium temperature high pressure generator; and
      iv) from at least one of low temperature condenser and low pressure absorber to medium pressure evaporator.

2. The apparatus according to claim 1 additionally comprised of an inter-loop condensed refrigerant to solution sensible heat exchanger (CSSHX) which sensibly cools the condensed refrigerant of the high temperature loop and sensibly heats part of the weak solution of the double-effect cycle.

3. The apparatus according to claim 1 additionally comprised of LiBr absorbent in the double-effect loop and a mixture of NaOH and KOH as absorbent in the high temperature loop.

4. The apparatus according to claim 1 additionally comprised of an intra-loop CSSHX which transfers sensible heat from the condensed refrigerant of the high temperature loop to the weak absorbent of the double-effect loop.

5. The apparatus according to claim 1 additionally comprised of a prime heating medium and means for transfer of sensible heat from the prime heating medium to the weak absorbent of at least one of said loops.

6. A process for improving the efficiency of a triple effect absorption cycle apparatus having two hermetically separate loops, one loop having three pressure levels and the other loop having two pressure levels, comprising transferring sensible heat from the condensed refrigerant of the two pressure level loop to the weak absorbent of the three pressure level loop; and cooling said condensed refrigerant by at least 40° C. thereby; and heating said weak absorbent by at least 30° C. thereby.

7. A triple effect absorption cycle cooling apparatus comprised of:
   a) two hermetic absorption loops, the first loop having three pressure levels and the second loop having two pressure levels; and
   b) a liquid-to-liquid heat exchanger (CSSHX) for exchange of sensible heat from the condensed refrigerant of the second loop to the absorbent solution of the first loop.

8. The apparatus according to claim 7 wherein said second loop is comprised of a single direct-fired generator, and wherein said first loop is comprised of a single generator which is heated by both the condenser and the absorber of the second loop.

9. The apparatus according to claim 7 wherein said second loop is comprised of a single direct-fired generator, and said first loop is comprised of two pressure staged generators.

10. The apparatus according to claim 9 wherein said first loop contains LiBr as absorbent plus conventional mass transfer enhancing additive.

11. The apparatus according to claim 9 wherein said second loop contains a mixture of alkali nitrates as absorbent.

12. The apparatus according to claim 9 wherein the absorber and condenser of the second loop supply latent heat respectively to the higher pressure generator and lower pressure generator of the first loop.

13. The apparatus according to claim 12 wherein the absorber of the first loop supplies latent heat to the evaporator of the second loop.

14. The apparatus according to claim 12 wherein the lower pressure condenser of the second loop supplies latent heat to the evaporator of the second loop.

15. The apparatus according to claim 7 wherein said CSSHX is in series with the solution heat exchanger for said absorbent.

16. The apparatus according to claim 7 wherein said CSSHX is in parallel with the solution heat exchanger for said absorbent.

17. The apparatus according to claim 16 wherein said CSSHX is integrated into and a part of the solution heat exchanger for said absorbent.

18. The apparatus according to claim 7 additionally comprised of an intra-loop CSSHX for said second loop.

19. The process according to claim 6 additionally comprising maintaining all of said pressure levels below one atmosphere pressure.

* * * * *